March 11, 1969　　M. L. FLICKINGER ET AL　　3,432,122

COMBINATION BALLONET AND DILATION SYSTEM FOR BALLOONS

Filed June 19, 1967

INVENTORS
MAYNARD L. FLICKINGER
ROBERT S. ROSS

BY: Oldham & Oldham
ATTORNEYS

United States Patent Office 3,432,122
Patented Mar. 11, 1969

3,432,122
COMBINATION BALLONET AND DILATION SYSTEM FOR BALLOONS
Maynard L. Flickinger, Akron, and Robert S. Ross, Northfield Center, Ohio, assignors to Goodyear Aerospace Corporation, Akron, Ohio, a corporation of Delaware
Filed June 19, 1967, Ser. No. 646,864
U.S. Cl. 244—31
Int. Cl. B64b 1/54, 1/62
2 Claims

ABSTRACT OF THE DISCLOSURE

Utilization of a combination ballonet-dilation system for a semi-rigid or pressure rigidited balloon takes advantage of the best features of both systems, while allowing for atmospheric pressure and temperature variations as the balloon is raised or lowered.

Prior art

This invention relates to a combination ballonet-dilation system preferably for non-rigid or pressure rigidited ballons.

Heretofore, it has been well known that dilation systems and ballonet systems have been useful in lighter-than-air non-rigid or semi-rigid balloons to compensate for changes in the gas volume as atmospheric pressure changes with the altitude of the balloon. However, the dilation system which relies upon a stretching or elastic technique is limited in its operational effect to relatively small altitude changes. While the ballonet system is readily adaptable to compensate for large variations in altitude and temperature, this system requires a great deal of energy to continuously supply air to compensate for altitude changes. The equipment necessary to operate a ballonet system requiring considerable energy is normally quite heavy and this is the item of major concern. Thus, in a situation where it may be necessary to compensate for rather large altitude and temperature fluctuations because a dilation system will not completely handle the situation, the invention contemplates incorporation of a combination dilation-ballonet system whereby the ballonet system does not function until the dilation system is no longer effective, thus utilizing the best features of both systems with the least power requirements.

It is the general object of the invention to utilize a combination dilation-ballonet system preferably for a lighter-than-air non-rigid or semi-rigid balloon or aircraft whereby the ballonet system functions only when the dilation system has been stretched or compressed to its maximum extent.

For a better understanding of the invention reference should be had to the accompanying drawings wherein.

Figure 1:
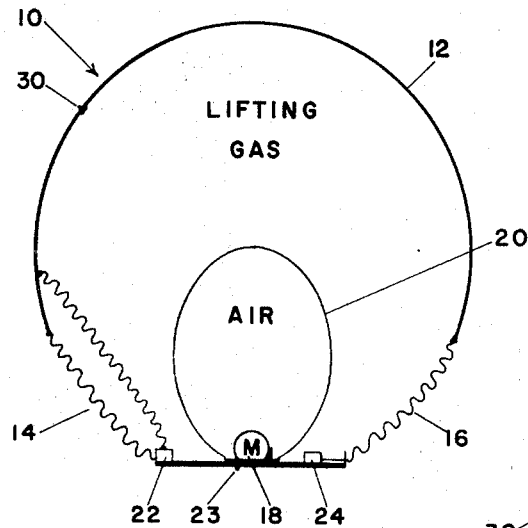
FIG. 1 is a cross sectional elevation of a semi-rigid lighter-than-air balloon incorporating an embodiment of the invention.

With reference to the form of the invention illustrated in the drawings, the numeral 10 indicates generally a lighter-than-air non-rigid or semi-rigid balloon or aircraft which comprises an outer rather inelastic or rigid skin 12 with a dilation system on both bottom edges of skin 12 at 14 and 16, respectively. The systems 14 and 16 will generally extend a sufficient length or distance axially of the aircraft so as to provide a complete functioning of this type system in a manner usual in the art. The dilation systems 14 and 16 are shown connected to a base portion and a motor, pump, or fan 18, mounted on the base portion which has an inflatable air bag, bladder, or ballonet 20 connected thereto. The bladder 20 may be expandable or non-expandable as desired for the particular situation. In the embodiment illustrated the bladder is expandable. The bladder 20 is normally filled with air supplied from and/or compressed by motor 18 which draws its source from the atmosphere, whereas the interior of skin 12 is filled with a suitable lifting gas.

The particular design incorporated into the balloon 10 is believed to be applicable to such a balloon as the V-balloon illustrated and described in the United States Patent No. 3,151,825 which among other things is used for logging purposes. In such a logging operation, where timber is being cut high up on a mountainside and being brought by the balloon back down into the valley, there is considerable expansion and compression of the lifting gas during the altitude and temperature change from the top of the mountain to the bottom. Hence, a combination ballonet-dilation system has advantages for this type of balloon operation. However, it should be understood that there are applications for high altitude balloons not in logging applications where a combined system could definitely be used to advantage.

Therefore, to meet these needs, the invention contemplates that the actuation of motor 18 to inflate or deflate the bladder 20 is controlled by a switch 22 actuated upon substantially the maximum extension of the dilation systems 14 and 16, and a switch 24 actuated upon the maximum compression of dilation system 14 and 16 as both systems 14 and 16 usually expand or contract uniformly. While the actuation of switches 22 and 24 is illustrated as being mechanical, they can be pressure actuated switches.

Figure 2:
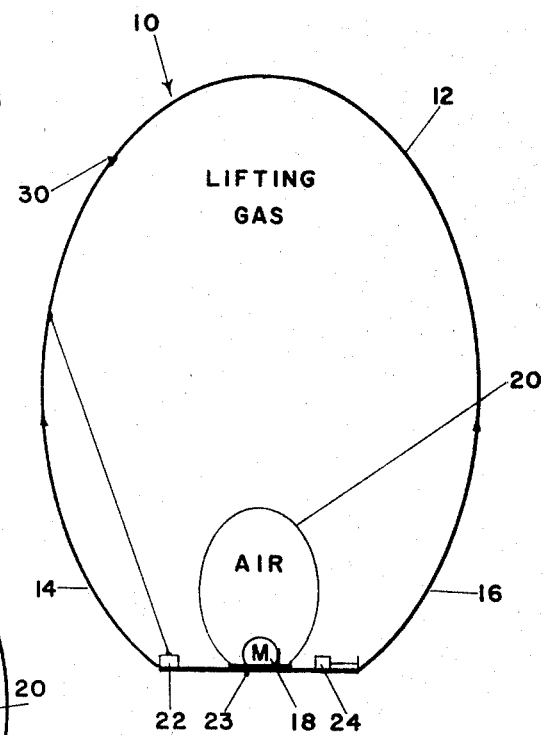
FIG. 2 is similar to FIG. 1 except with the lifting gas greatly expanded indicating a rise in altitude of the balloon to stretch the dilation system beyond its maximum extent.

Then, in operation, when the balloon 10 travels to an increased altitude or upon a rise in temperature the lifting gas expands, and as indicated in FIG. 2, the dilation systems 14 and 16 will be stretched to their maximum extent thereby causing actuation of switch 22 which preferably would open a valve 23 to release some air from the inflatable bladder 20 to further help compensate for the change in the volumetric size of the balloon for a desired pressure of the lifting gas. At this increased altitude or temperature, the bladder 20 being expandable in this situation hence will decrease in size.

Figure 3:
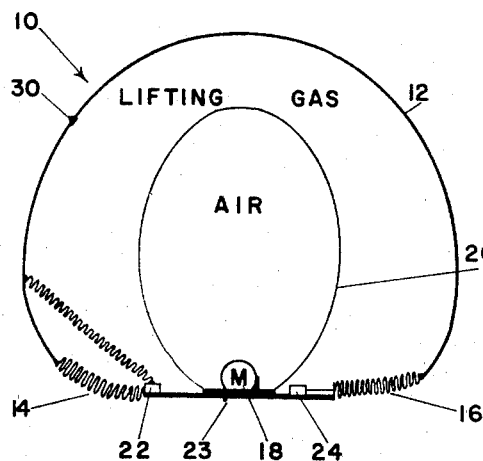
FIG. 3 is similar to FIG. 1 except with the balloon in a lower altitude position whereby the lifting gas is greatly compressed beyond the maximum compression point of the dilation system.

FIG. 3 illustrates the balloon 10 in a very low altitude or low temperature relation where the lifting gas has been compressed causing full compression of the dilation systems 14 and 16, and hence the actuation of switch 24 to energize motor 18 to actually add more air into inflatable bladder 20 to compensate for the compressed relationship of the lifting gas. The use of the ballonet thus operates to maintain substantially the fixed size of the semi-rigid skin 12 when the lifting gas expands or contracts more than the dilation system can compensate.

Therefore, it is seen that the objects of the invention are achieved by utilizing a ballonet system comprising a motor 18 and bladder 20 with a dilation system 14 and 16 to achieve the best features of both systems. The motor 18 can be battery powered, and since it will operate for only short intervals of time when the ballonet becomes necessary upon the maximum expansion or compression of the dilation system, very little energy and hence less battery weight is required to drive the motor over a longer period of time. The switches 22 and 24 can be any convenient make and actuated either mechanically or by pressure to electrically actuate the motor 18 to either force air into bladder 20, or actuate valve 23 to dump air, as the circumstances require, and any suitable connection to cause actuation thereof upon the full expansion or compression of dilation systems 14 and 16 will meet the objects of the invention. A relief valve 30 may be utilized to eliminate excessive pressures.

Thus, in accordance with the patent statutes, only one best known embodiment of the invention has been illustrated and described in detail, it is to be understood that the invention is not limited thereto or thereby.

What is claimed is:

1. In a lighter-than-air aircraft the combination of a fluid tight semi-rigid superstructure comprising a skin portion and a base portion, and a lifting gas inside the superstructure which is characterized by an extensible and contractible elastic dilation system connecting the skin portion and base portion to maintain the fluid tight relation of the superstructure while allowing limited expansion and contraction thereof, an inflatable ballonet inside the balloon superstructure, and means to control the inflation of the ballonet responsive to the expansion and contraction of the dilation system.

2. An aircraft according to claim 1 where the means to control the ballonet air volume comprises an air pump means between the ballonet and the atmosphere, a relief valve on the ballonet, and switch means to selectively control the actuation of the pump means or the relief valve when the dilation system is fully expanded or compressed.

References Cited

UNITED STATES PATENTS

| | | | |
|---|---|---|---|
| 2,492,800 | 12/1949 | Isom | 244—31 |
| 2,886,263 | 5/1959 | Ferguson | 244—31 |
| 3,108,765 | 10/1963 | Stone | 244—31 |
| 3,119,579 | 1/1964 | Borgeson et al. | 244—31 |
| 3,232,207 | 2/1966 | Gibbons | 244—33 X |

MILTON BUCHLER, *Primary Examiner.*

RICHARD A. DORNON, *Assistant Examiner.*